Figure 1:
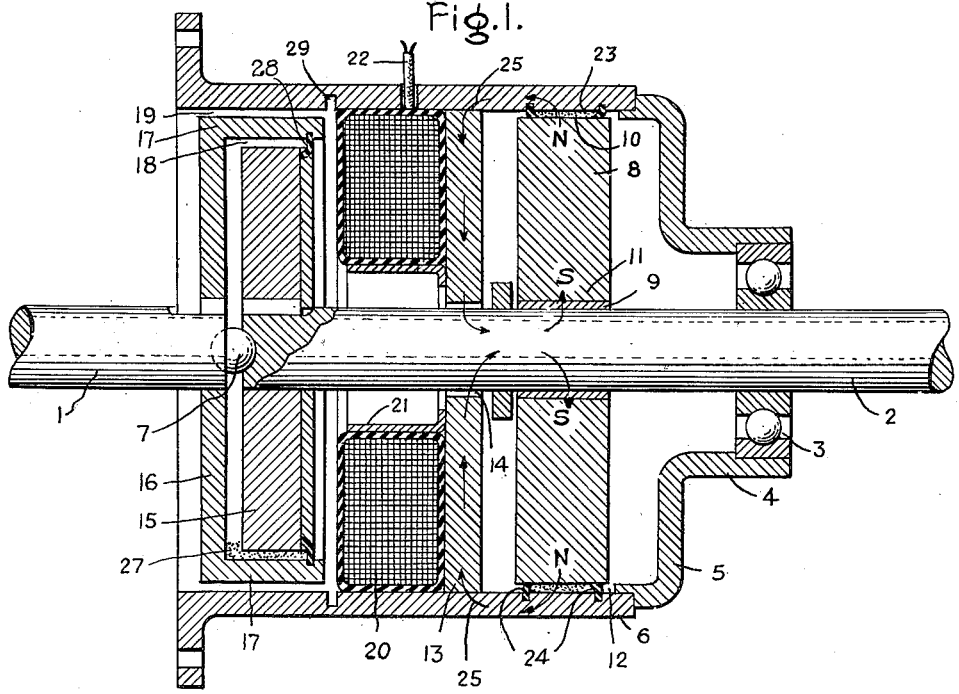

March 6, 1951     M. L. SCHMIDT     2,544,360

CLUTCH AND BRAKE MECHANISM

Filed Nov. 14, 1949

Inventor:
Marvin L. Schmidt,
by Ernest C. Britton
His Attorney.

Patented Mar. 6, 1951

2,544,360

UNITED STATES PATENT OFFICE 2,544,360

CLUTCH AND BRAKE MECHANISM

Marvin L. Schmidt, Fort Wayne, Ind., assignor to General Electric Company, a corporation of New York Application November 14, 1949, Serial No. 127,087

8 Claims. (Cl. 192—12)

This invention relates to clutch-brakes and more particularly to clutch-brakes for use with electric motors wherein a driving connection is provided when the motor is energized and a braking force is applied when the motor energization is removed.

In the design of clutch-brakes for electric motors, it has been customary to provide an exciting coil arranged in the energizing circuit of the motor, the coil serving as an electromagnet to attract an armature member slidably mounted on the driven shaft to form a driving connection. When the energization is removed from the motor, resilient means are usually provided to bias the driven shaft armature member out of engagement with the driving member and into engagement with a braking surface on a stationary frame member. This arrangement necessitates a fairly complicated construction and additionally involves a periodic replacement of braking material on the braking surface. It is, therefore, desirable to provide a clutch-brake wherein no moving parts or springs are required and wherein wear at the braking surface is eliminated.

It is, therefore, an object of this invention to provide an improved clutch-brake.

Another object of this invention is to provide an improved and simplified clutch-brake having no moving parts other than the driving and driven members.

A further object of this invention is to provide an improved clutch-brake wherein wear at the braking surface is eliminated.

Further objects and advantages of this invention will be better understood from the following description referring to the accompanying drawing, and the features of novelty which characterize this invention will be pointed out with particularity in the claims annexed to and forming a part of this specification.

In accordance with this invention, there is provided a clutch-brake having a driving shaft and a driven shaft, a permanent magnet being mounted on the driven shaft forming a first air gap with a stationary frame member. A flux conducting wall is secured to the stationary member defining a second air gap with the driven shaft and thus providing a magnetic circuit for the permanent magnet. An annular flux conducting armature member is secured to the driven shaft, and an annular flux conducting cup-shaped member is secured to the driving shaft defining a third air gap with the driven shaft armature member and a fourth air gap with the frame member. An exciting coil is provided on a stationary member adapted to produce flux traversing the wall member and the second, third, and fourth air gap. The first air gap between the permanent magnet and the stationary frame member is filled with a magnetic fluid so that a braking action is provided when the exciting coil is not energized. The third air gap between the driven shaft armature member and the driving shaft cup member is also filled with magnetic fluid providing a driving connection between the shafts when the exciting coil is energized. The exciting coil is arranged so that its flux traverses the frame member and the wall member in the proper direction to render the permanent magnet ineffective so that the braking action is released when the exciting coil is energized.

Figure 2:
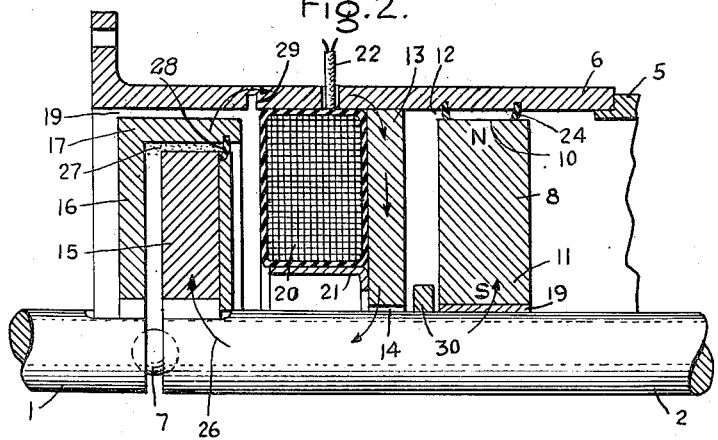

In the drawing,

Fig. 1 is a side elevational view, partly in section, illustrating the improved clutch-brake of this invention during the braking action; and Fig. 2 illustrates the device of Fig. 1 with the driving connection established.

Referring now to Fig. 1, there is shown a driving shaft 1 adapted to be connected to a source of driving power, such as an electric motor (not shown), and a driven shaft 2. The driven shaft 2 is journaled in suitable bearings 3 mounted in a bearing retaining portion 4 of end shield 5, which is secured to a stationary frame member 6. A ball thrust bearing 7 is interposed between the driving shaft 1 and the driven shaft 2. An annular permanent magnet 8, preferably formed of an iron base alloy containing aluminum, nickel, copper, cobalt, and titanium, is cast around a soft steel sleeve member 9 which, in turn, is mounted on the driven shaft 2. The permanent magnet 8 is polarized to form one polarity at its outer surface 10 and the other polarity at its inner surface 11, as shown in Fig. 1, and its outer surface 10 defines an air gap 12 with the stationary frame member 6. An annular flux conducting wall member 13 is mounted on the stationary frame member 6 in any suitable manner and extends radially inward forming an air gap 14 with the driven shaft 2. An annular flux conducting armature member 15 is keyed to the end of the driven shaft 2, and a cup-shaped member 16 having a cylindrical flange portion 17 is keyed to the driving shaft 1. The cylindrical flange portion 17 of the cup-shaped member 16 forms an air gap 18 with the armature member 15 and another air gap 19 with the stationary frame member 6. An annular exciting coil 20 is arranged within the frame member 6 in the space between the armature member 15 and the wall 13 and is supported by a bracket 21 so that it abuts the frame member 6 and the wall 13. The exciting coil 20 is energized through lines 22 from any suitable source, as for instance the energizing circuit of the driving motor.

The air gap 12 between the permanent magnet 8 and the stationary frame member 6 is filled with a magnetic fluid 23, such as powdered magnetic iron particles suspended in oil, which is retained in position by seals 24 secured to the frame member 6. As shown in Fig. 1, when the exciting coil 20 is not energized, the flux produced by the permanent magnet 8 will traverse the air gap 12, the frame member 6, the wall 13, the air gap 14, and the shaft 2 as shown by the arrows 25. This flux solidifies the magnetic fluid 23 providing a braking action which holds the driven shaft 2 stationary.

Referring now to Fig. 2, the exciting coil 20 when energized produces flux traversing the wall 13, the air gap 14, the shaft 2, the armature member 15, the air gap 18, the cylindrical flange portion 17, the air gap 19, and the frame member 6, as shown by the arrows 26. The air gap 18 between the armature member 15 and the cylindrical flange portion 17 of the cup-shaped member 16 is also filled with a magnetic fluid 27, which is solidified by the flux 26 to establish a driving connection between the armature member 15 and the cup-shaped member 16 when the exciting coil 20 is energized. The exciting coil 20 is so wound and connected that the flux shown by the arrows 26 traverses the wall 13 in the same direction as the flux, shown by the arrows 25, produced by the permanent magnet 8. By proper design of the coil 20, the mmf. across the air gap 14 can be made equal to the mmf. in the permanent magnet 8, and under this condition there will be no permanent magnet flux in the air gap 12, thus permitting the magnetic fluid 23 to return to the fluid state and releasing the braking torque. The seals 24 associated with the air gap 12 prevent the magnetic fluid from leaking out of the air gap when the permanent magnet 8 has been rendered ineffective, and a seal 28 is provided to keep the magnetic fluid 27 from leaking out of the air gap 18 when the exciting coil 20 is not energized.

In the event that the clutch-brake is utilized with an electric motor, the exciting coil 20 being arranged in the energizing circuit of the motor, the coil 20 can be designed so that the mmf. in the air gap 14 exactly equals the mmf. in the permanent magnet 8 when the current in the coil corresponds to the motor load current at maximum required torque. If the load is light or overhauling, the current in the exciting coil 20 drops, destroying the mmf. balance so that the braking torque is restored in the air gap 12, thus preventing overspeed of the driven shaft 2. In order to prevent demagnetization of the permanent magnet 8 under sustained overloads, a restricted section 29 is provided in the stationary frame member 6 intermediate the exciting coil 20 and the air gap 19 and in order to provide additional protection to the permanent magnet 8 from the effect of starting inrush current in the coil 20, a damping ring 30 is secured to the driven shaft 2 intermediate the permanent magnet 8 and the wall 13.

It will now be readily apparent that this invention provides an improved clutch-brake wherein both the braking and driving action is secured by the provision of magnetic fluid, thus eliminating the necessity for all moving parts. It will be readily understood that both the driving and braking action will be smooth and, since no direct frictional engagement is provided with a brake surface, no replacement of braking material is necessary.

While I have illustrated and described a particular embodiment of this invention, modifications thereof will occur to those skilled in the art, and it is to be understood therefore that this invention is not to be limited to the particular arrangement disclosed, and it is intended in the appended claims to cover all modifications which do not depart from the spirit and scope of this invention.

What I claim as new and desire to secure by Letters Patent of the United States is:

1. A clutch-brake having a rotatable member, a stationary frame member, a permanent magnet mounted on one of said members forming a first air gap with the other of said members, flux conducting means on one of said members forming a second air gap with the other of said members providing a magnetic circuit for said permanent magnet, a flux conducting member mounted on said rotatable member, a second rotatable member having another flux conducting member mounted thereon forming a third air gap with said first-mentioned flux conducting member and a fourth air gap with said frame member, and an exciting coil adapted to produce flux traversing said flux conducting means and said third air gap, said first air gap having a magnetic fluid therein adapted to be solidified by the flux produced by said permanent magnet when said exciting coil is not energized, whereby braking torque is applied to said first-mentioned rotatable member, said third air gap having a magnetic fluid therein adapted to be solidified by the flux produced by said coil to a driving connection between said rotatable members when said exciting coil is energized, said exciting coil being arranged to produce flux traversing said flux conducting means in the proper direction to render said permanent magnet ineffective when said coil is energized so that no permanent magnet flux traverses said first air gap whereby said magnetic fluid in said first air gap returns to the fluid state releasing said braking torque.

2. A clutch-brake having a driving shaft and a driven shaft, a stationary frame member, a permanent magnet mounted on one of said shafts defining a first air gap with said frame member, flux conducting means on said frame member forming a second air gap with said one shaft providing a magnetic circuit for said permanent magnet, a flux conducting member on said one shaft, another flux conducting member on the other of said shafts defining a third air gap with said first-mentioned flux conducting member and a fourth air gap with said frame member, and an exciting coil on said frame member adapted when energized to produce flux traversing said frame member flux conducting means and said third air gap, said first air gap having a magnetic fluid therein adapted to be solidified by the flux produced by said permanent magnet when said exciting coil is not energized, whereby braking torque is applied to said one shaft, said third air gap having a magnetic fluid therein adapted to be solidified by the flux produced by said coil to form a driving connection between said flux conducting members when said coil is energized, said coil being arranged to produce flux traversing said frame member flux conducting means in the proper direction to render said permanent magnet ineffective when said coil is energized so that no permanent magnet flux traverses said first air gap whereby said magnetic fluid in said first air gap returns to the fluid state releasing said braking torque.

3. A clutch-brake having a driving shaft and a driven shaft, a stationary frame member, a permanent magnet mounted on said driven shaft and polarized to form one polarity at its outer surface and the other polarity at its inner surface adjacent said driven shaft, said permanent magnet defining a first air gap with said frame member, flux conducting means on said frame member forming a second air gap with said driven shaft providing a magnetic circuit for said permanent magnet, a flux conducting member on said driven shaft, another flux conducting member on said driving shaft defining a third air gap with said driven shaft flux conducting member and a fourth air gap with said frame member, and an exciting coil on said frame member adapted when energized to produce flux traversing said frame member flux conducting means and said third air gap, said first air gap having a magnetic fluid therein adapted to be solidified by the flux produced by said permanent magnet when said exciting coil is not energized whereby braking torque is applied to said driven shaft, said third air gap having a magnetic fluid therein adapted to be solidified by the flux produced by said coil to form a driving connection between said driving and driven shaft flux conducting members when said coil is energized, said coil being arranged to produce flux traversing said frame member flux conducting means in the proper direction to render said permanent magnet ineffective when said coil is energized so that no permanent magnet flux traverses said first air gap whereby said magnetic fluid in said first air gap returns to the fluid state releasing said braking torque.

4. A clutch-brake having a driving shaft and a driven shaft, a stationary frame member, a permanent magnet mounted on said driven shaft and polarized to form one polarity at its outer surface and the other polarity at its inner surface adjacent said driven shaft, said permanent magnet defining a first air gap with said frame member, flux conducting means on said frame member forming a second air gap with said driven shaft providing a magnetic circuit for said permanent magnet, an annular flux conducting member on said driven shaft, a cup-shaped flux conducting member on said driving shaft forming a third air gap with said driven shaft flux conducting member and a fourth air gap with said frame member, and an exciting coil on said frame member adapted when energized to produce flux traversing said frame member flux conducting means and said third air gap, said first air gap having a magnetic fluid therein adapted to be solidified by the flux produced by said permanent magnet when said exciting coil is not energized whereby braking torque is applied to said driven shaft, said third air gap having a magnetic fluid therein adapted to be solidified by the flux produced by said coil to form a driving connection between said driving and driven shaft flux conducting members when said coil is energized, said coil being arranged to produce flux traversing said frame member flux conducting means in the proper direction to render said permanent magnet ineffective when said coil is energized so that no permanent magnet flux traverses said first air gap whereby said magnetic fluid in said first air gap returns to the fluid state releasing said braking torque.

5. A clutch-brake having a driving shaft and a driven shaft, a stationary frame member, a permanent magnet mounted on said driven shaft and polarized to form one polarity at its outer surface and the other polarity at its inner surface adjacent said driven shaft, said permanent magnet defining a first air gap with said frame member, flux conducting means on said frame member forming a second air gap with said driven shaft providing a magnetic circuit for said permanent magnet, a flux conducting member on said driven shaft, another flux conducting member on said driving shaft defining a third air gap with said driven shaft flux conducting member and a fourth air gap with said frame member, and an exciting coil on said frame member adapted when energized to produce flux traversing said frame member flux conducting means and said third air gap, said first air gap having a magnetic fluid therein adapted to be solidified by the flux produced by said permanent magnet when said exciting coil is not energized whereby braking torque is applied to said driven shaft, said third air gap having a magnetic fluid therein adapted to be solidified by the flux produced by said coil to form a driving connection between said driving and driven shaft flux conducting members when said coil is energized, said coil being arranged to produce flux traversing said frame member flux conducting means in the proper direction to render said permanent magnet ineffective when said coil is energized so that no permanent magnet flux traverses said first air gap whereby said magnetic fluid in said first air gap returns to the fluid state releasing said braking torque, said frame member having a restricted section therein for preventing demagnetization of said permanent magnet under sustained overloads.

6. A clutch-brake having a driving shaft and a driven shaft, a stationary frame member, a permanent magnet mounted on said driven shaft and polarized to form one polarity at its outer surface and the other polarity at its inner surface adjacent said driven shaft, said permanent magnet defining a first air gap with said frame member, flux conducting means on said frame member forming a second air gap with said driven shaft providing a magnetic circuit for said permanent magnet, a flux conducting member on said driven shaft, another flux conducting member on said driving shaft defining a third air gap with said driven shaft flux conducting member and a fourth air gap with said frame member, an exciting coil on said frame member adapted when energized to produce flux traversing said frame member flux conducting means and said third air gap, said first air gap having a magnetic fluid therein adapted to be solidified by the flux produced by said permanent magnet when said exciting coil is not energized whereby braking torque is applied to said driven shaft, said third air gap having a magnetic fluid therein adapted to be solidified by the flux produced by said coil to form a driving connection between said driving and driven shaft flux conducting members when said coil is energized, said coil being arranged to produce flux traversing said frame member flux conducting means in the proper direction to render said permanent magnet ineffective when said coil is energized so that no permanent magnet flux traverses said first air gap whereby said magnetic fluid in said first air gap returns to the fluid state releasing said braking torque, and flux damping means on said driven shaft for protecting said permanent magnet from the effect of starting inrush current in said exciting coil.

7. A clutch-brake having a driving shaft and a driven shaft, a stationary frame member, a permanent magnet mounted on said driven shaft and polarized to form one polarity at its outer surface and the other polarity at its inner surface adjacent said driven shaft, said permanent magnet defining a first air gap with said frame member, flux conducting means on said frame member forming a second air gap with said driven shaft providing a magnetic circuit for said permanent magnet, a flux conducting member on said driven shaft, another flux conducting member on said driving shaft defining a third air gap with said driven shaft flux conducting member and a fourth air gap with said frame member, and an exciting coil on said frame member adapted when energized to produce flux traversing said frame member flux conducting means and said third air gap, said first air gap having a magnetic fluid therein adapted to be solidified by the flux produced by said permanent magnet when said exciting coil is not energized whereby braking torque is applied to said driven shaft, said third air gap having a magnetic fluid therein adapted to be solidified by the flux produced by said coil to form a driving connection between said driving and driven shaft flux conducting members when said coil is energized, said coil being arranged to produce flux traversing said frame member flux conducting means in the proper direction to render said permanent magnet ineffective when said coil is energized so that no permanent magnet flux traverses said first air gap whereby said magnetic fluid in said first air gap returns to the fluid state releasing said braking torque, said first and third air gaps having sealing means for preventing leakage of said magnetic fluid when in the fluid state.

8. A clutch-brake having a driving shaft and a driven shaft, a stationary frame member, an annular permanent magnet mounted on said driven shaft and polarized to form one polarity at its outer surface and the other polarity at its inner surface, the outer surface of said permanent magnet defining an air gap with said frame member, a flux conducting wall member on said frame member extending radially inward to form a second air gap with said driven shaft providing a magnetic current for said permanent magnet, an annular flux conducting armature member mounted on said driven shaft on the side of said wall remote from said permanent magnet and spaced therefrom, a flux conducting cup-shaped member on said driving shaft defining a third air gap with said armature member and a fourth air gap with said frame member, and an annular exciting coil arranged in the space between said armature member and said wall member, said exciting coil being mounted on said frame member and abutting said wall member on its side remote from said permanent magnet, said exciting coil being adapted when energized to produce flux traversing said wall member and said third air gap, said first air gap having a magnetic fluid therein adapted to be solidified by the flux produced by said permanent magnet brake when said coil is not energized whereby braking torque is applied to said driven shaft, said third air gap having a magnetic fluid therein adapted to be solidified by the flux produced by said coil to form a driving connection between said armature member and said cup-shaped member when said coil is energized, said coil being arranged to produce flux traversing said frame member and said wall member in the proper direction to render said permanent magnet ineffective when said coil is energized so that no permanent magnet flux traverses said first air gap whereby said magnetic fluid in said first air gap returns to the fluid state releasing said braking torque.

MARVIN L. SCHMIDT.

REFERENCES CITED

The following references are of record in the file of this patent:

UNITED STATES PATENTS

| Number | Name | Date |
|---|---|---|
| 2,317,290 | McIlvried | Apr. 20, 1943 |
| 2,333,863 | Hull | Nov. 9, 1943 |
| 2,411,122 | Winkler | Nov. 12, 1946 |

OTHER REFERENCES

Bureau of Standards Technical Report 1213, April 2, 1948.